US008699450B2

(12) United States Patent
Chin et al.

(10) Patent No.: US 8,699,450 B2
(45) Date of Patent: Apr. 15, 2014

(54) SYSTEMS AND METHODS FOR MULTIMODE WIRELESS COMMUNICATION HANDOFF

(75) Inventors: Tom Chin, San Diego, CA (US); Kuo-Chun Lee, San Diego, CA (US); Ayman Fawzy Naquib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

(21) Appl. No.: 12/212,526

(22) Filed: Sep. 17, 2008

(65) Prior Publication Data

US 2009/0279504 A1 Nov. 12, 2009

Related U.S. Application Data

(63) Continuation-in-part of application No. 12/176,304, filed on Jul. 18, 2008.

(60) Provisional application No. 61/052,265, filed on May 11, 2008, provisional application No. 61/052,266, filed on May 11, 2008, provisional application No. 61/052,259, filed on May 11, 2008, provisional application No. 61/052,260, filed on May 11, 2008.

(51) Int. Cl.
*H04W 4/00* (2009.01)

(52) U.S. Cl.
USPC .......................................... 370/331; 455/436

(58) Field of Classification Search
USPC ......... 370/328–329, 331–333, 335–336, 338, 370/342, 437, 441; 455/422.1, 436–439, 455/442–444
See application file for complete search history.

(56) References Cited

U.S. PATENT DOCUMENTS

| 5,982,758 | A  | * | 11/1999 | Hamdy ........................ 370/331 |
| 6,094,575 | A  |   | 7/2000  | Anderson et al. |
| 6,173,181 | B1 | * | 1/2001  | Losh ............................ 455/434 |
| 6,252,861 | B1 | * | 6/2001  | Bernstein et al. ............. 370/331 |
| 6,459,689 | B1 | * | 10/2002 | Czaja et al. ................... 370/331 |
| 6,526,039 | B1 | * | 2/2003  | Dahlman et al. .............. 370/350 |
| 6,542,743 | B1 | * | 4/2003  | Soliman ....................... 455/436 |
| 6,625,132 | B1 | * | 9/2003  | Boettger et al. .............. 370/329 |
| 7,336,953 | B2 | * | 2/2008  | Kim et al. ..................... 455/438 |

(Continued)

FOREIGN PATENT DOCUMENTS

CN 1934880 A 3/2007
CN 101098546 A 1/2008

(Continued)

OTHER PUBLICATIONS

International Search Report—PCT/US09/032192, International Search Authority—European Patent Office—Jun. 23, 2009.

(Continued)

*Primary Examiner* — Kevin Mew
(74) *Attorney, Agent, or Firm* — Tyler J. Overall

(57) ABSTRACT

Methods and apparatus for autonomous handover between WiMAX (Worldwide Interoperability for Microwave Access) and CDMA (Code Division Multiple Access) EVDO (Evolution-Data Optimized) or 1×RTT (one times Radio Transmission Technology, or 1×) networks during normal operation of a dual-mode mobile station (MS) are provided. The methods and apparatus may improve service continuity during handover and need not require any changes to the WiMAX or CDMA standards.

72 Claims, 12 Drawing Sheets

(56) References Cited

U.S. PATENT DOCUMENTS

| | | | |
|---|---|---|---|
| 7,409,215 B2* | 8/2008 | Kurose et al. | 455/436 |
| 7,848,294 B2* | 12/2010 | Huang et al. | 370/331 |
| 7,929,970 B1* | 4/2011 | Gunasekara et al. | 455/444 |
| 2002/0119787 A1* | 8/2002 | Hunzinger | 455/455 |
| 2002/0126641 A1* | 9/2002 | Bender | 370/337 |
| 2003/0050063 A1 | 3/2003 | Faerber | |
| 2003/0235165 A1 | 12/2003 | Wang | |
| 2004/0252656 A1* | 12/2004 | Shiu et al. | 370/328 |
| 2005/0030931 A1 | 2/2005 | Sung et al. | |
| 2005/0090259 A1 | 4/2005 | Jain et al. | |
| 2005/0197124 A1 | 9/2005 | Kang et al. | |
| 2005/0202823 A1 | 9/2005 | Shaheen et al. | |
| 2005/0221824 A1 | 10/2005 | Lee et al. | |
| 2005/0239466 A1* | 10/2005 | Calin et al. | 455/437 |
| 2005/0277416 A1 | 12/2005 | Tolli et al. | |
| 2006/0040662 A1 | 2/2006 | Kim et al. | |
| 2006/0171359 A1 | 8/2006 | Schwarz | |
| 2006/0276189 A1 | 12/2006 | Kiernan et al. | |
| 2007/0008876 A1* | 1/2007 | Welnick et al. | 370/208 |
| 2007/0147303 A1 | 6/2007 | Noh | |
| 2007/0149196 A1 | 6/2007 | Choi et al. | |
| 2007/0270142 A1 | 11/2007 | Willey et al. | |
| 2007/0275726 A1 | 11/2007 | Lee et al. | |
| 2008/0025262 A1* | 1/2008 | Kim et al. | 370/331 |
| 2008/0062933 A1* | 3/2008 | Liu et al. | 370/332 |
| 2008/0233951 A1* | 9/2008 | Uchida et al. | 455/425 |
| 2008/0316968 A1* | 12/2008 | Sun et al. | 370/331 |
| 2009/0047957 A1 | 2/2009 | Westerberg | |
| 2009/0047958 A1 | 2/2009 | Rimhagen et al. | 455/436 |
| 2009/0221304 A1 | 9/2009 | Pudney | |
| 2009/0262705 A1* | 10/2009 | Kim et al. | 370/331 |
| 2009/0268688 A1* | 10/2009 | Lee et al. | 370/331 |
| 2009/0279503 A1 | 11/2009 | Chin et al. | |
| 2009/0280812 A1 | 11/2009 | Cheng et al. | |
| 2010/0131663 A1 | 5/2010 | Lee et al. | |
| 2010/0136975 A1* | 6/2010 | Onishi | 455/436 |
| 2012/0250548 A1* | 10/2012 | Swaminathan et al. | 370/252 |

FOREIGN PATENT DOCUMENTS

| | | | |
|---|---|---|---|
| CN | 101112113 A | 1/2008 | |
| CN | 101156466 A | 4/2008 | |
| EP | 1747698 A2 | 1/2007 | |
| EP | 1786231 A1 | 5/2007 | |
| JP | 2006501785 A | 1/2006 | |
| JP | 2008503976 A | 2/2008 | |
| JP | 2008507217 A | 3/2008 | |
| JP | 2008508779 A | 3/2008 | |
| JP | 2008219733 A | 9/2008 | |
| KR | 10495687 | 6/2005 | |
| KR | 100558582 B1 | 6/2006 | |
| KR | 100741376 B1 | 7/2007 | |
| KR | 20070074140 A | 7/2007 | |
| KR | 20080002905 A | 1/2008 | |
| KR | 20080020084 A | 3/2008 | |
| KR | 100820928 B1 | 4/2008 | |
| RU | 2287901 C1 | 11/2006 | |
| RU | 2321970 C2 | 4/2008 | |
| WO | WO9836588 A2 | 8/1998 | |
| WO | 02093955 | 11/2002 | |
| WO | WO-2004032539 A1 | 4/2004 | |
| WO | 2005025091 A1 | 3/2005 | |
| WO | 2005089249 A2 | 9/2005 | |
| WO | WO-2006020168 A2 | 2/2006 | |
| WO | 2006019268 | 5/2006 | |
| WO | 2006107701 | 10/2006 | |
| WO | 2007078043 | 7/2007 | |
| WO | WO2008013970 A2 | 1/2008 | |
| WO | WO2008069483 A1 | 6/2008 | |

OTHER PUBLICATIONS

International Search Report—PCT/US09/041755, International Search Authority—European Patent Office—Aug. 5, 2009.
Written Opinion—PCT/US09/032192, International Search Authority—European Patent Office—Jun. 23, 2009.
Written Opinion—PCT/US09/041755, International Search Authority—European Patent Office—Aug. 5, 2009.
Motorola et al, IEEE C802.16e-05/219r1, Additional Scan Measurement Metric, Triggers and Reporting Models, Jun. 8, 2005.
Anonymous: Draft standard for local and metropolitan area networks; Part 16: Air interface for fixed and mobile broadband wireless assess systems IEEE P802.1e/D9 XP002526865, Jun. 2005.
Wang Jidong, Bao Lichun: "Mobile context handoff in distributed IEEE 802.11 systems" Wireless Networks, Communications and Mobile Computing, 2005 International Conference, [Online] Jun. 13, 2005 pp. 1-6, XP002539220.
IEEE Std 802.16e-2005 and IEEE Std 802.16-2004/Cor1-2005, Section 6.3.2.3.42, SS De-registration Request (DREG-REQ) Message, pp. 80-82.
IEEE Std 802.16e-2005 and IEEE Std 802.16-2004/Cor1-2005, Section 6.3.24.1, MS Idle Mode Initiation, pp. 261-262.
International Search Report—PCT/US09/041752, International Search Authority—European Patent Office—Aug. 10, 2009.
Written Opinion—PCT/US09/041752, International Search Authority—European Patent Office—Aug. 10, 2009.

* cited by examiner

SYSTEMS AND METHODS FOR MULTIMODE WIRELESS COMMUNICATION HANDOFF

CLAIM OF PRIORITY

This application claims the benefit of priority from, and is a continuation-in-part of, U.S. patent application Ser. No. 12/176,304, filed Jul. 18, 2008 and entitled "Systems and Methods for Multimode Wireless Communication Handoff," which claims the benefit of priority from U.S. Provisional Patent Application Ser. No. 61/052,265, filed May 11, 2008 and entitled "Systems and Methods for Multimode Wireless Communication Handoff," and from U.S. Provisional Patent Application Ser. No. 61/052,266, also filed May 11, 2008 and also entitled "Systems and Methods for Multimode Wireless Communication Handoff," all of which are assigned to the assignee of this application and are fully incorporated herein by reference for all purposes.

This application also claims the benefit of priority from U.S. Provisional Patent Application Ser. No. 61/052,259, filed May 11, 2008 and entitled "Systems and Methods for Multimode Wireless Communication Handoff," and from U.S. Provisional Patent Application Ser. No. 61/052,260, also filed May 11, 2008 and also entitled "Systems and Methods for Multimode Wireless Communication Handoff," both of which are assigned to the assignee of this application and are fully incorporated herein by reference for all purposes.

TECHNICAL FIELD

Certain embodiments of the present disclosure generally relate to wireless communications and, more particularly, to autonomous handover of a mobile station (MS) from a WiMAX network to a CDMA, and vice versa.

BACKGROUND

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations. For various reasons, such as a mobile station (MS) moving away from the area covered by one base station and entering the area covered by another, a handover (also known as a handoff) may be performed to transfer communication services (e.g., an ongoing call or data session) from one base station to another.

Three handover methods are supported in IEEE 802.16e-2005: Hard Handoff (HHO), Fast Base Station Switching (FBSS) and Macro Diversity Handover (MDHO). Of these, supporting HHO is mandatory, while FBSS and MDHO are two optional alternatives.

HHO implies an abrupt transfer of connection from one BS to another. The handover decisions may be made by the MS or the BS based on measurement results reported by the MS. The MS may periodically conduct an RF scan and measure the signal quality of neighboring base stations. The handover decision may arise, for example, from the signal strength from one cell exceeding the current cell, the MS changing location leading to signal fading or interference, or the MS requiring a higher Quality of Service (QoS). Scanning is performed during scanning intervals allocated by the BS. During these intervals, the MS is also allowed to optionally perform initial ranging and to associate with one or more neighboring base stations. Once a handover decision is made, the MS may begin synchronization with the downlink transmission of the target BS, may perform ranging if it was not done while scanning, and may then terminate the connection with the previous BS. Any undelivered Protocol Data Units (PDUs) at the BS may be retained until a timer expires.

When FBSS is supported, the MS and BS maintain a list of BSs that are involved in FBSS with the MS. This set is called a diversity set. In FBSS, the MS continuously monitors the base stations in the diversity set. Among the BSs in the diversity set, an anchor BS is defined. When operating in FBSS, the MS only communicates with the anchor BS for uplink and downlink messages including management and traffic connections. Transition from one anchor BS to another (i.e., BS switching) can be performed if another BS in the diversity set has better signal strength than the current anchor BS. Anchor update procedures are enabled by communicating with the serving BS via the Channel Quality Indicator Channel (CQICH) or the explicit handover (HO) signaling messages.

A FBSS handover begins with a decision by an MS to receive or transmit data from the anchor BS that may change within the diversity set. The MS scans the neighbor BSs and selects those that are suitable to be included in the diversity set. The MS reports the selected BSs, and the BS and the MS update the diversity set. The MS may continuously monitor the signal strength of the BSs that are in the diversity set and selects one BS from the set to be the anchor BS. The MS reports the selected anchor BS on CQICH or MS-initiated handover request message.

For MSs and BSs that support MDHO, the MS and BS maintain a diversity set of BSs that are involved in MDHO with the MS. Among the BSs in the diversity set, an anchor BS is defined. The regular mode of operation refers to a particular case of MDHO with the diversity set consisting of a single BS. When operating in MDHO, the MS communicates with all BSs in the diversity set of uplink and downlink unicast messages and traffic.

An MDHO begins when an MS decides to transmit or receive unicast messages and traffic from multiple BSs in the same time interval. For downlink MDHO, two or more BSs provide synchronized transmission of MS downlink data such that diversity combining is performed at the MS. For uplink MDHO, the transmission from an MS is received by multiple BSs where selection diversity of the information received is performed.

SUMMARY

Certain embodiments of the present disclosure generally relate to performing autonomous handover of a mobile station (MS) from one radio access technology (RAT) network to another different RAT network, such as from a WiMAX network to a CDMA network, and vice versa. This handover may occur during normal operation of an MS, thereby allowing better service continuity while the MS travels from one network to the next.

Certain embodiments of the present disclosure provide a method for performing handover between network service via first and second RATs, wherein the first and second RATs are different. The method generally includes detecting a trigger to initiate a scan for network service via the second RAT while communicating via the first RAT; initiating the scan for the second RAT, in response to detecting the trigger; and determining whether to handover to network service via the second RAT based on results of the scan.

Certain embodiments of the present disclosure provide a receiver for wireless communication. The receiver generally includes trigger-detection logic configured to detect a trigger to initiate a scan for network service via a second RAT while communicating via a first RAT, wherein the first and second RATs are different; scan-initiation logic configured to initiate the scan for the second RAT, in response to detecting the trigger; and handover-determination logic configured to determine whether to handover to network service via the second RAT based on results of the scan.

Certain embodiments of the present disclosure provide an apparatus for performing handover between network service via first and second RATs. The apparatus generally includes means for detecting a trigger to initiate a scan for network service via the second RAT while communicating via the first RAT, wherein the first and second RATs are different; means for initiating the scan for the second RAT, in response to detecting the trigger; and means for determining whether to handover to network service via the second RAT based on results of the scan.

Certain embodiments of the present disclosure provide a mobile device. The mobile device generally includes a receiver front-end for communicating via a first RAT; trigger-detection logic configured to detect a trigger to initiate a scan for network service via the second RAT while communicating via the first RAT, wherein the first and second RATs are different; scan-initiation logic configured to initiate the scan for the second RAT, in response to detecting the trigger; and handover-determination logic configured to determine whether to handover to network service via the second RAT based on results of the scan.

Certain embodiments of the present disclosure provide a computer-readable medium containing a program for performing handover between network service via first and second radio RATs, which, when executed by a processor, performs certain operations. The operations generally include detecting a trigger to initiate a scan for network service via the second RAT while communicating via the first RAT; initiating the scan for the second RAT, in response to detecting the trigger; and determining whether to handover to network service via the second RAT based on results of the scan.

Certain embodiments of the present disclosure provide a computer-program apparatus for performing handover between network service via first and second radio access technologies (RATs) comprising a computer readable medium having instructions stored thereon. The instructions are executable by one or more processors. The instructions include instructions for, while communicating via the first RAT, detecting a trigger to initiate a scan for network service via the second RAT, wherein the first and second RATs are different. The instructions include instructions for initiating the scan for the second RAT, in response to detecting the trigger. The instructions include instructions for determining whether to handover to network service via the second RAT based on results of the scan.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide methods and apparatus for autonomous handover between WiMAX and CDMA EVDO/1× networks during normal operation of a dual-mode mobile station (MS). The methods and apparatus may improve service continuity during handover and need not require any changes to the WiMAX or the CDMA standards.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 October 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

Figure 1:
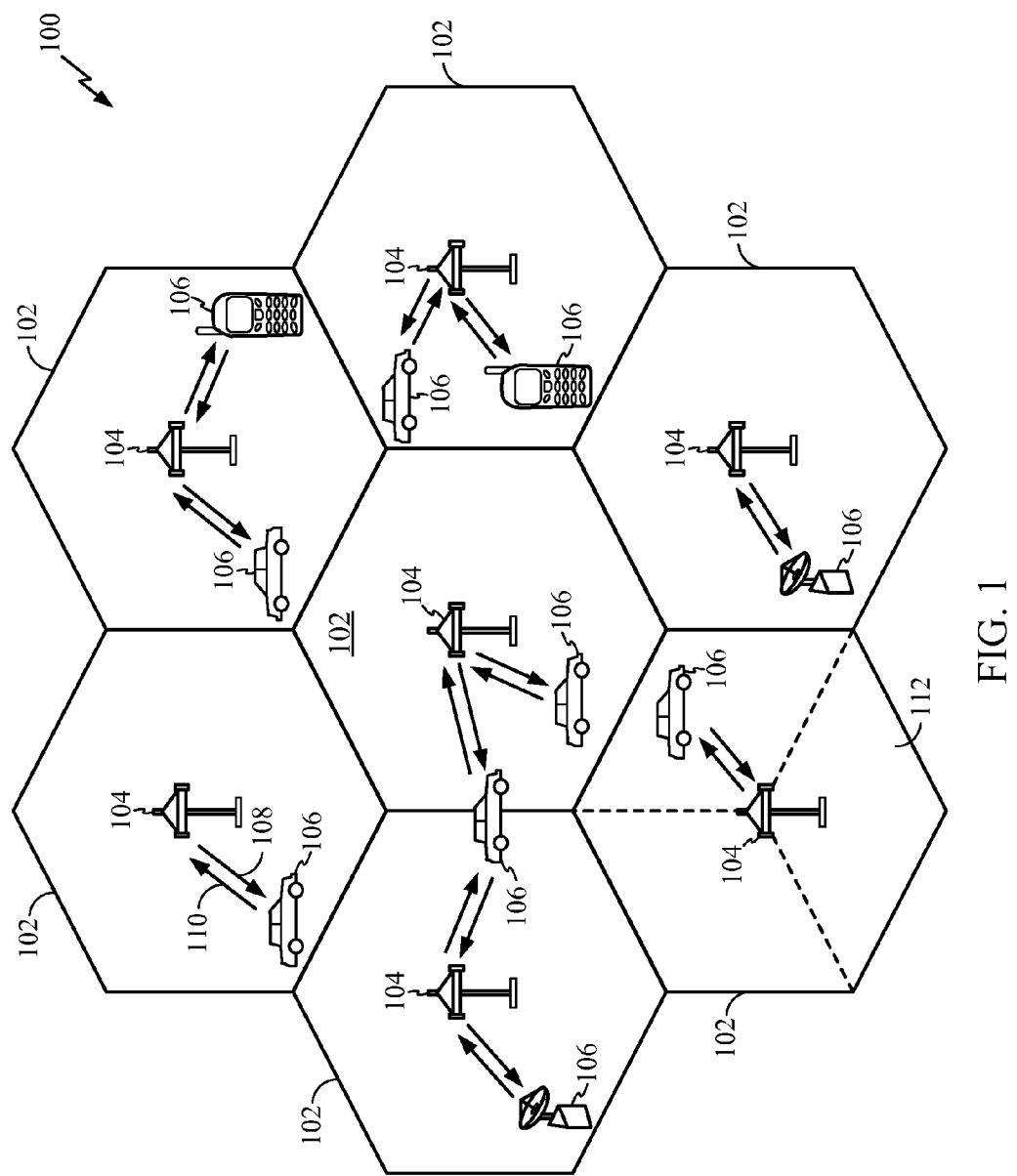
FIG. 1 illustrates an example wireless communication system, in accordance with certain embodiments of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
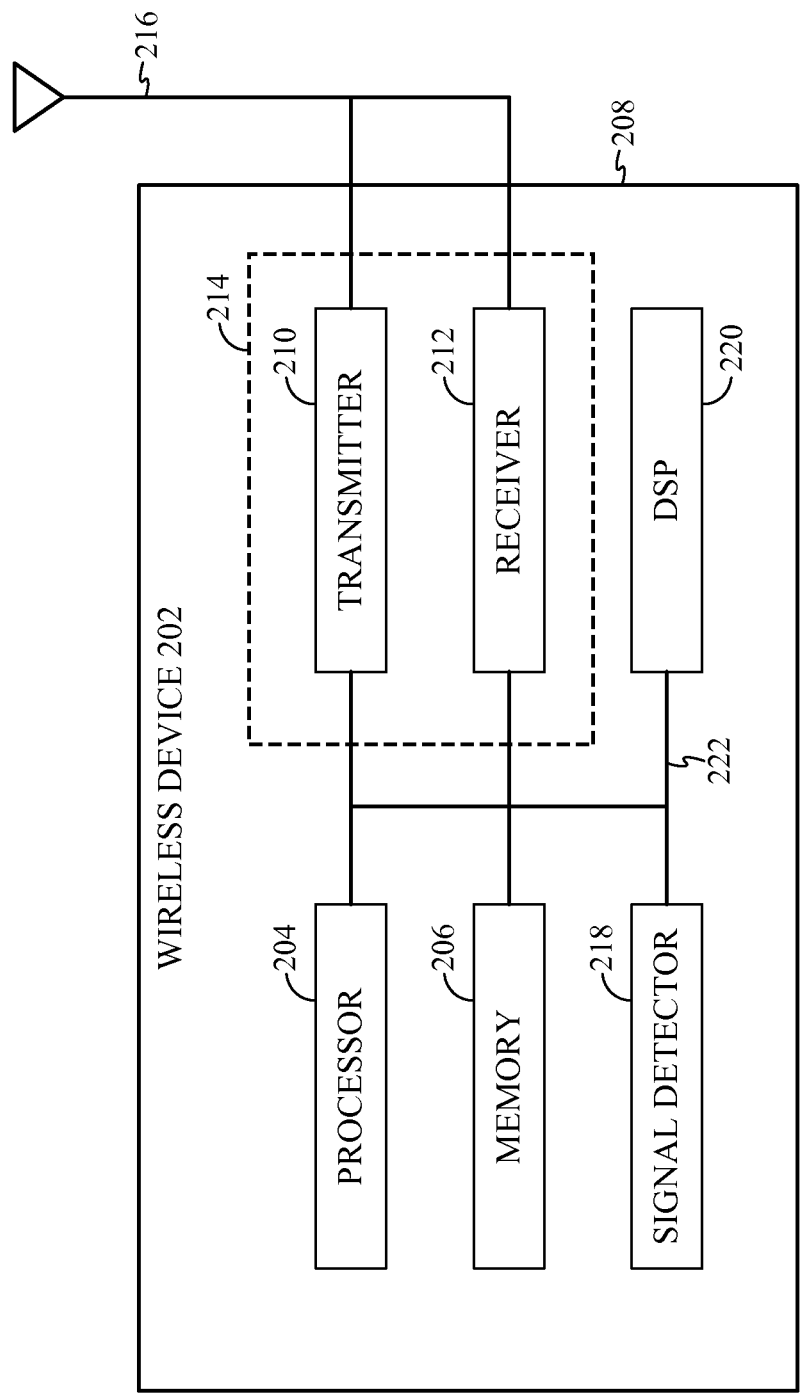
FIG. 2 illustrates various components that may be utilized in a wireless device, in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
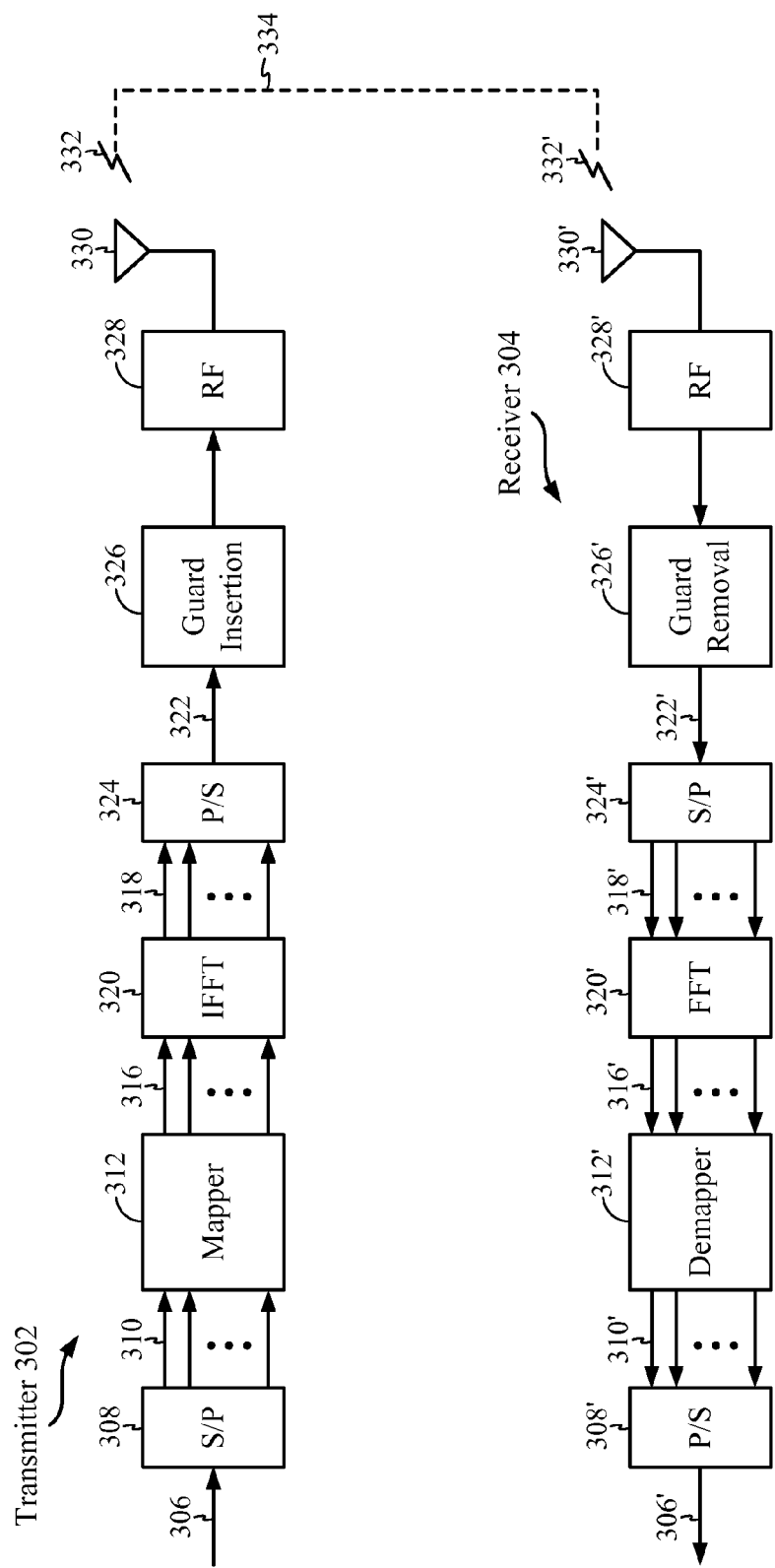
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Handover from WiMAX to CDMA

Figure 4A:
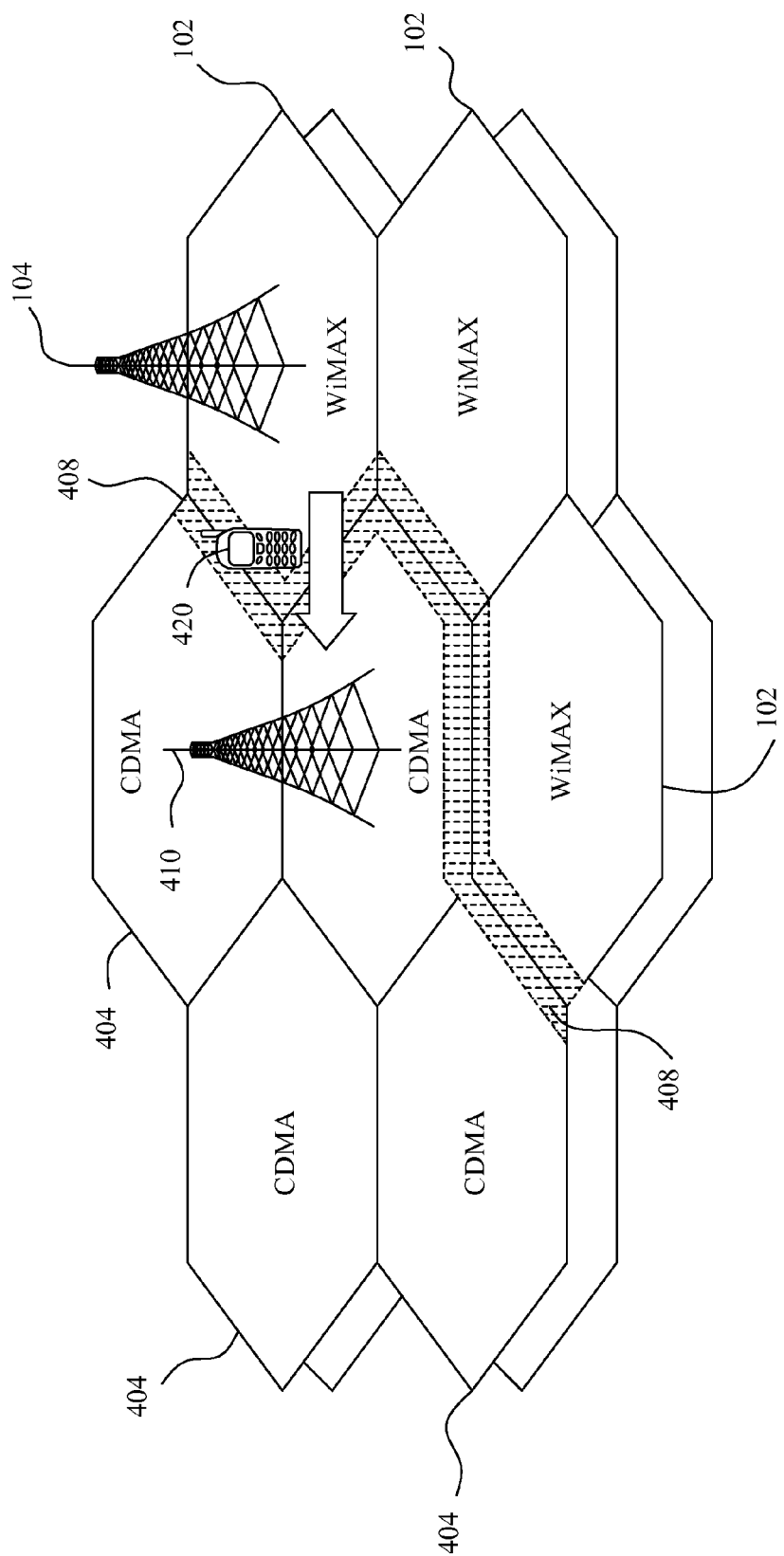
FIG. 4A illustrates a mobility scenario where a dual-mode mobile station (MS) may move outside the coverage of a WiMAX radio access network and enter the coverage of a CDMA EVDO/1× network, in accordance with certain embodiments of the present disclosure.

FIG. 4A illustrates a mobility scenario where WiMAX cells 102 are adjacent to Code Division Multiple Access (CDMA) cells 404. At least some of the WiMAX cells 102 may also provide coverage for CDMA signals, but for purposes of certain embodiments in the present disclosure, the cells 102 currently utilize WiMAX for communicating with the MS 420. Each WiMAX cell 102 typically has a WiMAX base station (BS) 104 to facilitate WiMAX network communications with a user terminal, such as a dual-mode MS 420. As used herein, a dual-mode MS generally refers to an MS that is capable of processing both WiMAX and CDMA signals. Similar to a WiMAX cell 102, each CDMA cell 404 typically has a CDMA BS 410 in order to facilitate CDMA Evolution-Data Optimized (EVDO) or 1 times Radio Transmission Technology (1×RTT, or simply 1×) communications, for example, with a user terminal, such as the MS 420.

In the present scenario of FIG. 4A, the MS 420 may move outside the coverage area of a WiMAX BS 104 and enter the coverage area of a CDMA BS 410. While transitioning from a WiMAX cell 102 to a CDMA cell 404 as shown, the MS 420 may enter a coverage overlap area 408 where the MS is able to receive signals from both networks.

It is during this transition that the MS may implement a handover process from a WiMAX BS to a CDMA BS. In addition to the normal difficulties associated with handover between two BSs of the same network type, handover between two BSs of different network types, such as from WiMAX to CDMA EVDO/1×, presents further challenges to service continuity, which are particularly acute if the MS is in the process of data transfer when the handover occurs.

Therefore, there is a need for techniques and apparatus such that a dual-mode MS may quickly and autonomously perform a handover from the WiMAX network to the CDMA network while minimizing service disruption.

Embodiments of the present disclosure provide methods and apparatus allowing a dual-mode MS to handover from a WiMAX network to a CDMA EVDO/1× network. Such techniques may increase service continuity while the MS moves from WiMAX to CDMA network coverage. Furthermore, embodiments of the present disclosure do not require any standard changes, and the handover may be automatically performed by the MS (i.e., the handover is an MS-autonomous procedure).

Figure 5:
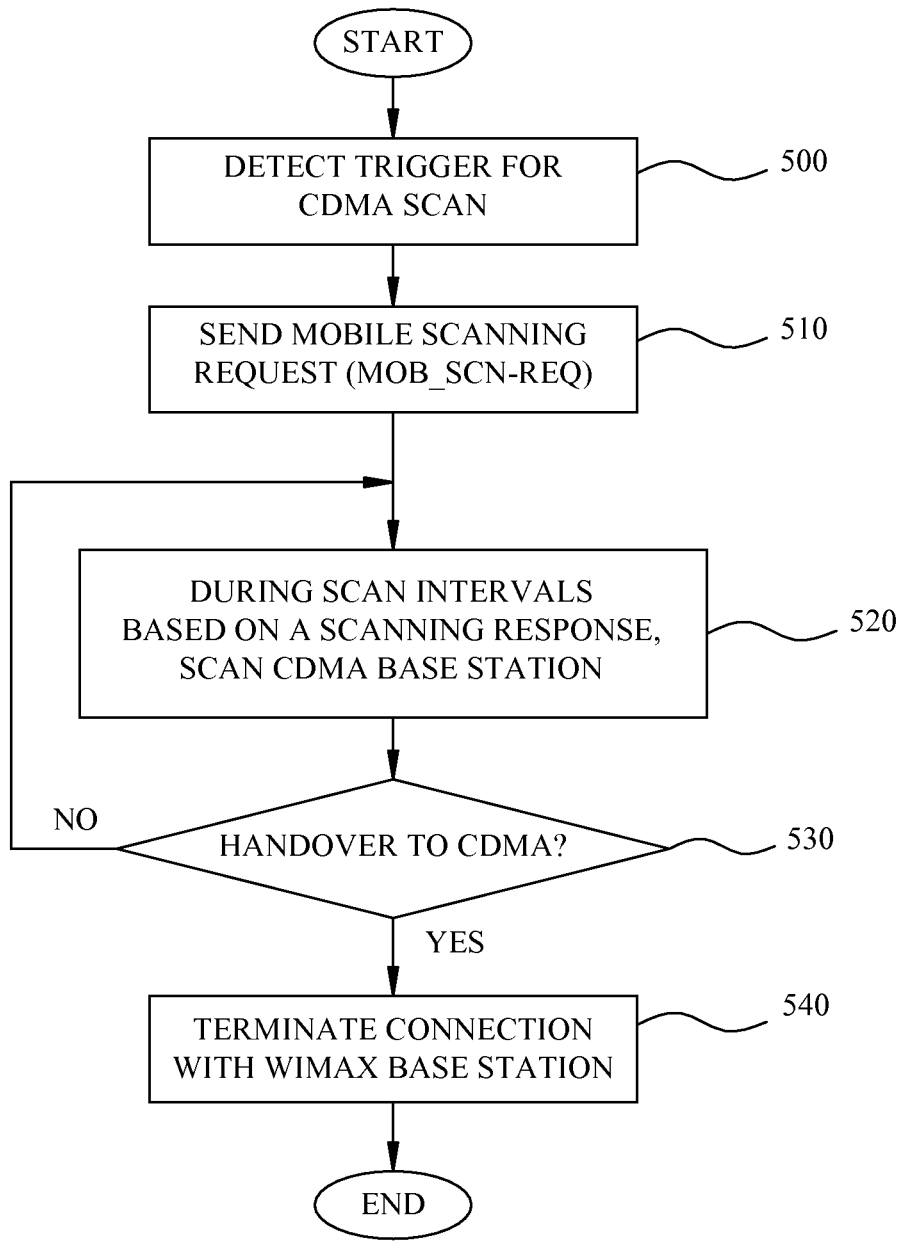
FIG. 5 is a flow chart of example operations for performing an autonomous handover of a dual-mode MS from a WiMAX network to a CDMA EVDO/1× network, in accordance with certain embodiments of the present disclosure.

FIG. 5 shows a flowchart of example operations for MS-autonomous handover from a WiMAX network to a CDMA EVDO/1× network. The operations begin, at 500, by detecting a trigger which may cause a dual-mode MS to scan for possible CDMA coverage. A trigger event may be intentionally periodic, may occur depending on the supported or selected handover method such as HHO, FBSS, or MDHO, or may occur when the number of neighbor BSs received in the Neighbor Advertisement Message is less than a number received in the past, for example.

Periodic triggering may occur at certain time intervals regardless of the status of the MS. For some embodiments, these time intervals may be preset in the MS, and may be subsequently updated with new time intervals if desired.

When an MS supports HHO, the trigger event may occur when the mean carrier-to-interference-plus-noise ratio (CINR) or mean received signal strength indicator (RSSI) of the serving WiMAX BS falls below a first threshold, and there is no neighbor WiMAX BS with a mean CINR or mean RSSI more than a second threshold, wherein the first and second thresholds may differ. For example, the serving WiMAX threshold and neighbor WiMAX threshold may be respectively represented as T_ScanCDMA_1 and T_ScanCDMA_2. In essence, this trigger event may occur when the MS has currently moved beyond the effective coverage of the serving WiMAX BS and there is no appropriate WiMAX BS to which to handover.

For an MS that supports FBSS or MDHO, triggering may occur when the mean CINR of all WiMAX BSs in a diversity set falls below a certain threshold. For example, this threshold may be represented as T_ScanCDMA_3, and furthermore may be equal to $(1+\gamma)*H\_Delete$, wherein $\gamma$ is an adjustment factor $\geq 0$ and H_Delete is a threshold used by FBSS/MDHO-capable MSs to determine when to drop a BS from the diversity set. With the adjustment factor $\gamma$, the triggering threshold may be greater than the H_Delete threshold in an effort to trigger scanning for CDMA coverage sufficiently before the moving MS has lost WiMAX coverage and tries to initiate a handover. In sum, this trigger event may occur when all nearby WiMAX BS CINR values experience a drop below a certain threshold, therefore predicting that the MS is going to move or indicating that the MS has moved outside the effective coverage of the WiMAX network.

Neighbor Advertisement Message triggering may occur when the number of neighboring WiMAX BSs received in the Neighbor Advertisement Message (MOB_NBR-ADV) is less than $\beta$ multiplied with the average number of the neighbor BSs in the MOB_NBR-ADV message received in the past, wherein $\beta$ is an adjustment factor $\geq 0$. For example, scanning may be triggered upon receiving the $n^{th}$ MOB_NBR-ADV message in which $N\_NBR(n)<\beta*A\_N\_NBR(n-1)$, n=0, 1, 2..., where N_NBR(n) is the number of neighbor BSs in the current MOB_NBR-ADV message, $A\_N\_NBR(n)=\alpha*N\_NBR(n)+(1-\alpha)*A\_N\_NBR(n-1)$ is the exponential moving average, and $\alpha$ is the smoothing factor for the moving average.

Because the WiMAX BS may continue to broadcast the same neighbor message, the index n need not be incremented—and the average A_N_NBR(n) need not be calculated—after receiving each MOB_NBR-ADV message. Rather, the index n may be incremented in the event of a handover or an update to the anchor BS in MDHO or FBSS when the MS may receive a different Neighbor Advertisement Message.

In order to scan the CDMA EVDO/1× network without losing data packets in the WiMAX network, any current data transmissions may be temporarily suspended. Thus, when one of the above trigger conditions is met, the MS may request suspension of any current data transmission with the WiMAX network by sending a Scanning Interval Allocation Request (MOB_SCN-REQ) message at 510 to the WiMAX BS in an effort to notify the BS of certain time intervals when the MS may be unavailable for communication with the WiMAX network to scan the CDMA EVDO/1× network.

The MOB_SCN-REQ message may comprise parameters such as scan duration, interleaving interval, and scan iteration. The scan duration may be the duration (in units of OFDM/OFDMA frames) of the requested scanning period, the interleaving interval may be the period of MS normal operations interleaved between scanning durations, and the scan iteration may be the requested number of iterating scanning interval(s) by an MS. These parameters are discussed in greater detail below with respect to FIG. 6.

After receiving the scanning request message, the WiMAX BS may then respond with a Scanning Interval Allocation Response (MOB_SCN-RSP) message. The BS may either grant or deny the scanning request.

Upon triggering a scan for the CDMA EVDO/1× network, the MS may scan the CDMA network at 520 using a preferred roaming list (PRL), which may be pre-programmed in the MS. The PRL may provide CDMA channel information in an effort to scan for possible CDMA pilots, synchronize to the CDMA network, and/or acquire the Sector Parameter Message or System Parameter Message. All CDMA BSs successfully identified in scanning may be included in the CDMA pilot candidate set. Each candidate pilot may comprise the following attributes: EVDO or 1× protocol revision; Band Class; Channel Number; System Identification Number (SID), Network Identification Number (NID), Packet Zone ID, and Pilot Pseudo Noise (PN) Offset.

Figure 6:
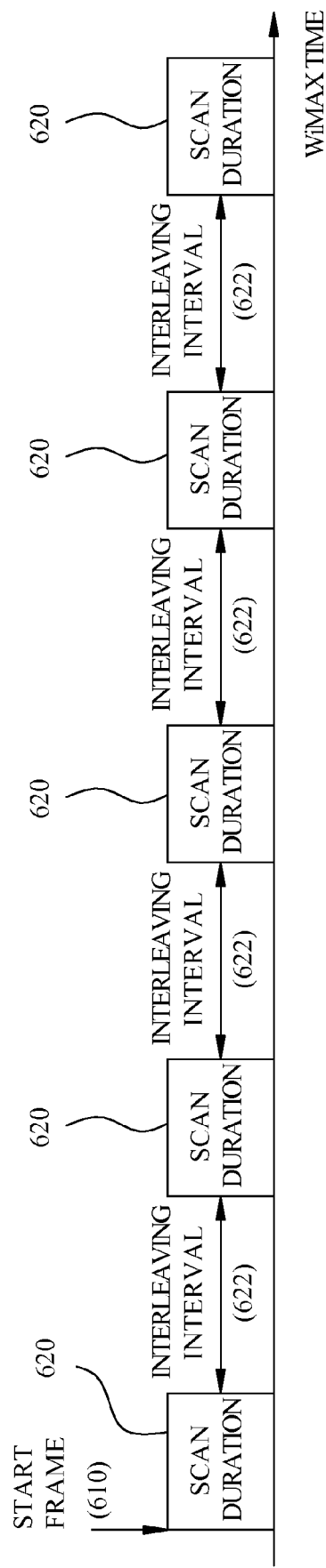
FIG. 6 illustrates example CDMA scanning intervals requested by an MS communicating using a WiMAX network service during the interleaving intervals, in accordance with certain embodiments of the present disclosure.

FIG. 6 shows the scanning intervals in which the MS performs the CDMA BS scan. Upon detecting a trigger for a CDMA EVDO/1× network scan at 500, the MS may begin scanning for networks, shown by the Start Frame 610. Thereafter, the MS may scan for CDMA networks for a predetermined scan duration 620 at the end of which, the MS may discontinue the scan for a predetermined interleaving interval 622 and resume normal operation. This alternating pattern of scanning and interleaving may continue until the end of the CDMA BS scan. Rather than multiple scan iterations, the MOB_SCN-REQ scan iteration parameter may indicate a single scan iteration for some embodiments. In such cases, the scan for CDMA BSs may only include a single scan duration.

Each time scanning completes, one or more new candidate CDMA pilot(s) may be added in the candidate set. Conversely, one or more existing candidate CDMA pilot(s) may be deleted from the CDMA candidate set if the pilot is no longer found during scanning.

Depending on the results of the CDMA BS scan, the MS may autonomously determine whether to initiate a handover to the CDMA BS at 530. The decision to handover may be triggered depending on the handover method supported by the MS, in addition to the CDMA BS scan indicating that some candidate CDMA BS is available. For HHO, the handover may be triggered when the serving BS has a mean CINR less than a threshold and/or mean RSSI less than another threshold and/or BS Round Trip Delay (RTD) more than yet another threshold. For FBSS or MDHO, handover may be triggered when all BSs in the diversity set are about to drop, namely with mean CINR less than H_Delete.

If the decision to handover to a CDMA BS is made at 530, then during handover at 540, the MS may signal intent to enter an idle state by sending a De-register Request (DREG-REQ) message to the serving WiMAX BS. Upon receiving a response from the WiMAX BS (e.g., a De-register Command (DREG-CMD) message) or a timeout, the MS may terminate connection with the WiMAX BS. After terminating the data connection, the MS may search all CDMA pilots in the candidate set and measure the pilot strength of each pilot. Then the MS may choose the strongest pilot for access to the CDMA EVDO/1× network. The MS may then start access and set up a new data session and connection with the CDMA BS associated with the strongest pilot.

However, if no pilots are found in the candidate set, the MS may begin a fresh CDMA channel search to identify possible CDMA pilots for access. Additionally, if the handover to the CDMA EVDO/1× network fails before a predetermined deadline, the MS may still return to the WiMAX network using the network reentry after idle mode procedure as specified in the WiMAX standards to resume the previous data session.

Figure 7:
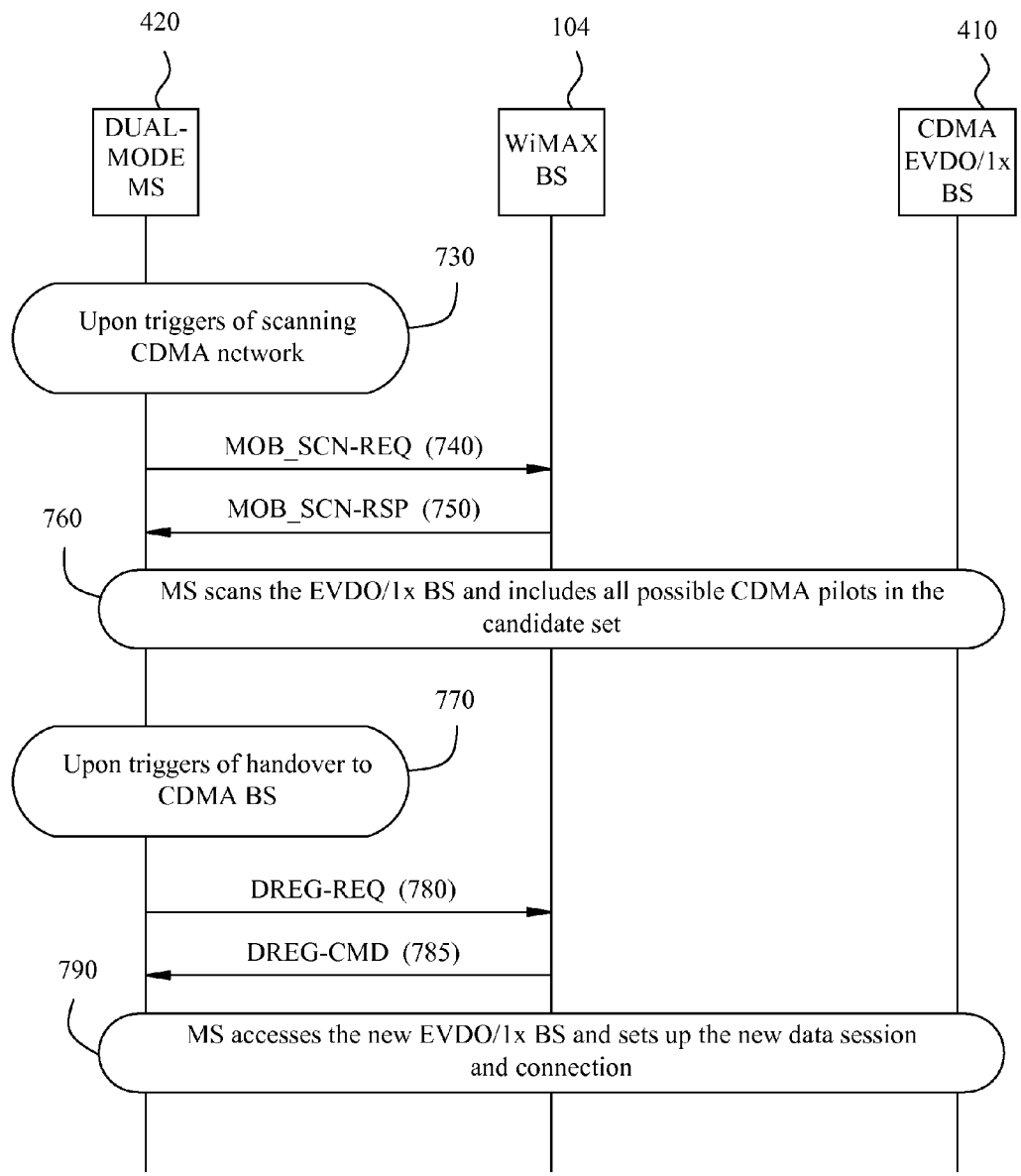
FIG. 7 illustrates a call flow of example operations for performing an MS-autonomous handover from a WiMAX base station to a CDMA EVDO/1× base station, in accordance with certain embodiments of the present disclosure.

FIG. 7 further illustrates the MS-autonomous WiMAX to CDMA EVDO/1× handover procedure and details the interaction between the dual-mode MS 420, the WiMAX BS 104, and the CDMA BS 410. As stated previously, the WiMAX to CDMA EVDO/1× handover process may begin with a trigger for scanning the CDMA network at 730. The MS may then send a scanning request (MOB_SCN-REQ) to the WiMAX BS at 740. At 750, the WiMAX BS may respond with a scanning response (MOB_SCN-RSP) granting the request. Thereafter, the MS may scan the CDMA EVDO/1× BSs and include all possible CDMA pilots in the candidate set at 760. When a trigger for actual handover is received at 770, the MS may send a De-register Request (DREG-REQ) to the WiMAX BS at 780. In response at 785, the WiMAX BS may send a De-register Command (DREG-CMD) to instruct the MS to terminate normal operations with the WiMAX BS. The MS may then access the new CDMA EVDO/1× BS and set up a new data session and connection at 790.

Exemplary Handover from CDMA to WiMAX

Figure 4B:
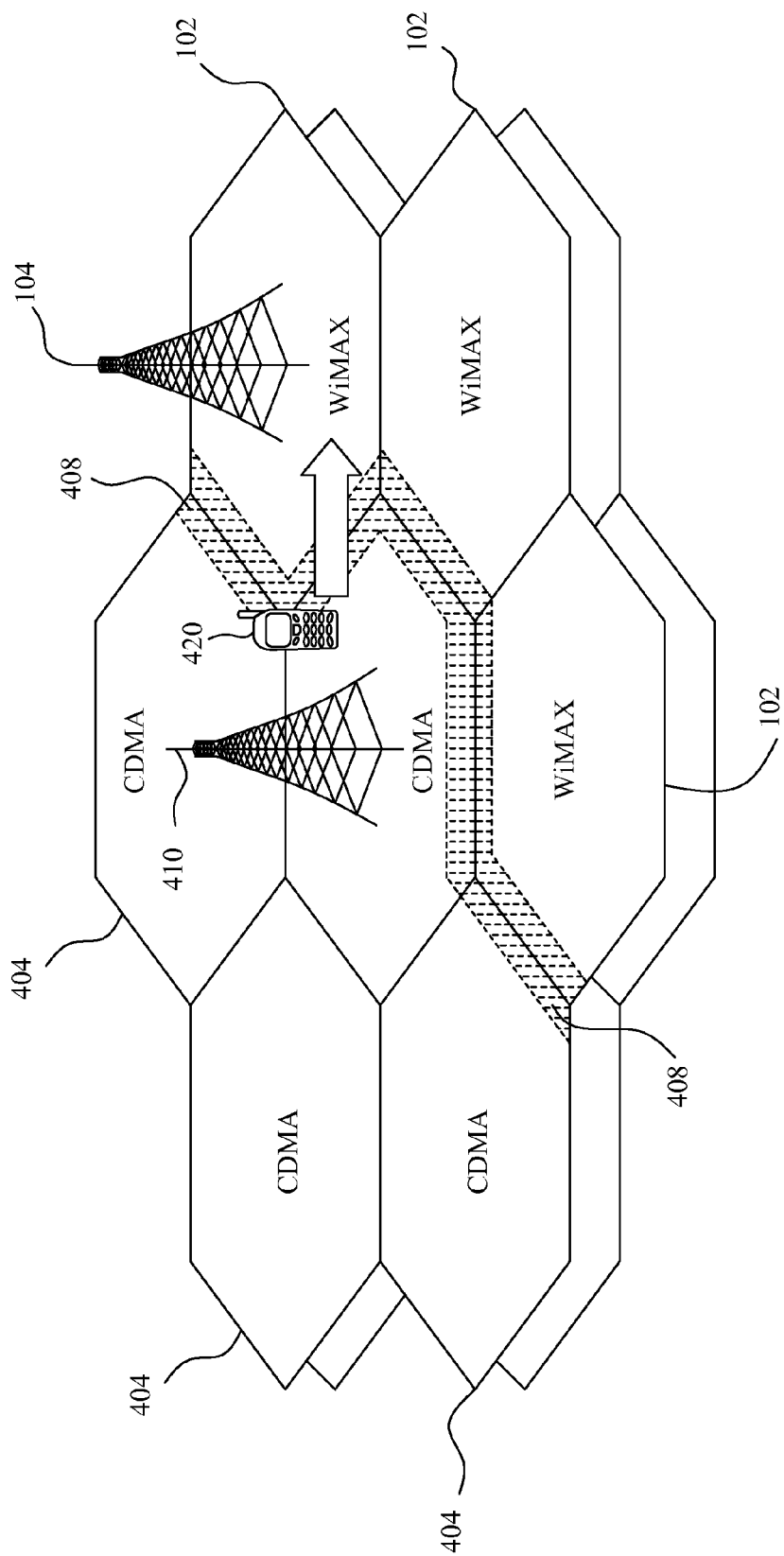
FIG. 4B illustrates a mobility scenario where a dual-mode MS may move outside the coverage of a CDMA EVDO radio access network and enter the coverage of a WiMAX network, in accordance with certain embodiments of the present disclosure.

FIG. 4B illustrates a mobility scenario where Code Division Multiple Access (CDMA) cells 404 are adjacent to WiMAX cells 102. At least some of the CDMA cells 404 may also provide coverage for WiMAX signals, but for purposes of certain embodiments in the present disclosure, the CDMA cells 404 may currently utilize CDMA Evolution-Data Optimized (EVDO) for communicating with a user terminal, such as a dual-mode MS 420. Each CDMA cell 404 typically has a CDMA BS 410 to facilitate CDMA EVDO network communications with the dual-mode MS 420.

In the present scenario of FIG. 4B, the MS 420 may move outside the coverage area of a CDMA BS 410 and enter the coverage area of a WiMAX BS 104. While transitioning from a CDMA cell 404 to a WiMAX cell 102 as shown, the MS 420 may enter a coverage overlap area 408 where the MS is able to receive signal from both networks.

It is during this transition that the MS may implement a handover process from a CDMA BS to a WiMAX BS. In addition to the normal difficulties associated with handover between two BSs of the same network type, handover between two BSs of different network types, such as from CDMA EVDO to WiMAX, presents further challenges to service continuity, which are particularly acute if the MS is in the process of data transfer when the handover occurs.

Therefore, there is a need for techniques and apparatus such that a dual-mode MS may quickly and autonomously perform a handover from a CDMA network to a WiMAX network while minimizing service disruption.

Embodiments of the present disclosure provide methods and apparatus allowing a dual-mode MS to handover from a CDMA EVDO network to a WiMAX network. Such techniques may increase service continuity while the MS moves from CDMA to WiMAX network coverage. Furthermore, the embodiments of the present disclosure do not require any standard changes, and the handover may be automatically performed by the MS (i.e., the handover is an MS-autonomous procedure).

Figure 8:
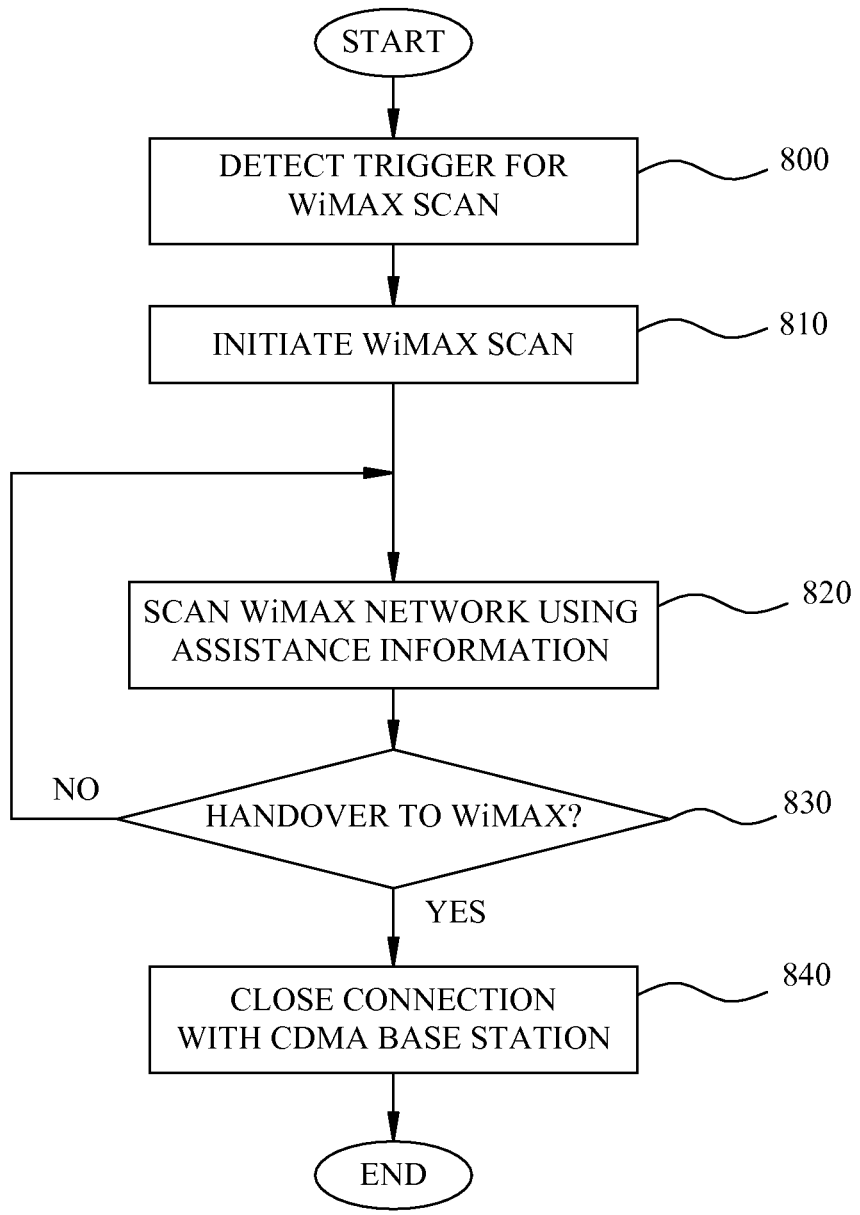
FIG. 8 is a flow chart of example operations for performing an autonomous handover of a dual-mode MS from a CDMA EVDO network to a WiMAX network, in accordance with certain embodiments of the present disclosure.

FIG. 8 shows a flowchart of example operations for MS-autonomous handover from a CDMA EVDO network to a WiMAX network. The operations begin, at 800, by detecting a trigger which may cause a dual-mode MS to scan for possible WiMAX coverage. A trigger event may be intentionally periodic, may occur depending on the pilot strength threshold in the CDMA active set, or may occur depending on a number-of-neighbors threshold, for example.

Periodic triggering may occur at certain time intervals regardless of the status of the MS. For some embodiments, these time intervals may be preset in the MS, and may be subsequently updated with new time intervals if desired.

Pilot strength threshold triggering may occur when all the pilots in the CDMA active set have a pilot strength less than a certain threshold. For example, this threshold may be represented as T_ScanWiMAX, which may be represented as $(1+\gamma)*T\_DROP$, wherein $\gamma$ is an adjustment factor $\geq 0$ and T_DROP is a threshold used by MSs to determine when to drop a pilot from the CDMA active set. With the adjustment factor $\gamma$, the triggering threshold may be greater than the T_DROP threshold in an effort to trigger scanning for WiMAX coverage sufficiently before the moving MS has lost CDMA coverage and tries to initiate a handover. In sum, this trigger event may occur when all nearby CDMA BS pilot strength values drop below a certain threshold, therefore predicting that the MS is going to move or indicating that the MS has moved outside the effective coverage area of the CDMA network.

Number-of-neighbors threshold triggering may occur when the number of neighboring CDMA BSs received in the Neighbor List Message, Extended Neighbor List Message, General Neighbor List Message, or Universal Neighbor List Message is less than $\beta$ multiplied with the average number of the neighbors in the (Extended/General/Universal) Neighbor List Messages received in the past, wherein $\beta$ is an adjustment factor $\geq 0$. For example, scanning may be triggered upon receiving the $n_{th}$ (Extended/General/Universal) Neighbor List Message in which $N\_NBR(n) < \beta * A\_N\_NBR(n-1)$, $n = 0, 1, 2 \ldots$, where $N\_NBR(n)$ is the number of neighbor sectors in the current (Extended/General/Universal) Neighbor List Message, $A\_N\_NBR(n) = \alpha * N\_NBR(n) + (1-\alpha) * A\_N\_NBR(n-1)$ is the exponential moving average, and $\alpha$ is the smoothing factor.

Upon triggering a scan for the WiMAX network, the MS may initiate a WiMAX network scan at 810. In order to scan the WiMAX network without losing data packets in the CDMA EVDO network, any current data transmissions may be temporarily suspended. Thus, when one of the above trigger conditions is met, the MS may request suspension of any current data transmission with the CDMA EVDO network by sending "null cover" as the Data Rate Control (DRC) cover to the CDMA BS in an effort to notify the BS of certain time intervals when the MS may be unavailable for communication with the CDMA EVDO network to scan the WiMAX network.

After sending a DRC cover to the CDMA EVDO BS, the MS may scan the WiMAX network at 820 using assistance information, which may be pre-programmed into the MS. For example, the assistance information may comprise: band class, bandwidth, FFT size, and ratio of cyclic prefix (CP). Using this information, the MS may search for the WiMAX BS preamble, synchronize to the WiMAX framing, read the DL-MAP, or even acquire the Downlink Channel Descriptor (DCD) and the Uplink Channel Descriptor (UCD) messages. Thereafter, WiMAX BSs in the neighboring area that are successfully identified through scanning may be added into the WiMAX BS candidate set. Each candidate WiMAX BS in the candidate set may include the following attributes: BS ID, bandwidth, FFT size, ratio of CP, Frequency Assignment (FA) index, frame size, preamble index, and optional DCD/UCD.

Following the scan, the MS may notify the CDMA EVDO BS of completion of the scanning process by sending a DRC Cover=Sector Cover message to the CDMA EVDO BS. Additionally, one or more new candidate WiMAX BS(s) may be added into the candidate set. Conversely, one or more existing candidate WiMAX BS(s) may be deleted from the candidate set if the candidate WiMAX BS(s) is/are no longer found during scanning.

Depending on the results of the WiMAX BS scan, the MS may autonomously determine whether to initiate a handover to the WiMAX BS at 830. The decision to handover may depend on which trigger event occurred, in addition to the WiMAX BS scan indicating that some candidate WiMAX BS is available. For example, handover may occur when all the pilots in the active set are about to be dropped.

If the decision to handover to a WiMAX BS is made at 830, then during handover at 840, the MS may send a Connection Close message to the CDMA BS in an effort to close the data connection with the CDMA EVDO network and enter a dormant state. Next, the MS may scan all the WiMAX BSs in the candidate set and measure the channel quality according to the CINR and/or the RSSI. The MS may choose the most proper WiMAX BS candidate with either the largest CINR or RSSI, for example, for access to the WiMAX network. The MS may then initiate network entry access and set up a new data session and connection with the selected WiMAX BS.

However, if no WiMAX BSs are found in the candidate set, the MS may begin a fresh WiMAX channel search in order to identify possible WiMAX BSs for access. Additionally, if the handover to the WiMAX network fails before a predetermined deadline, the MS may still return to the CDMA EVDO network using the reactivation from dormancy procedure specified in the CDMA EVDO standards to resume the previous data session.

Figure 9:
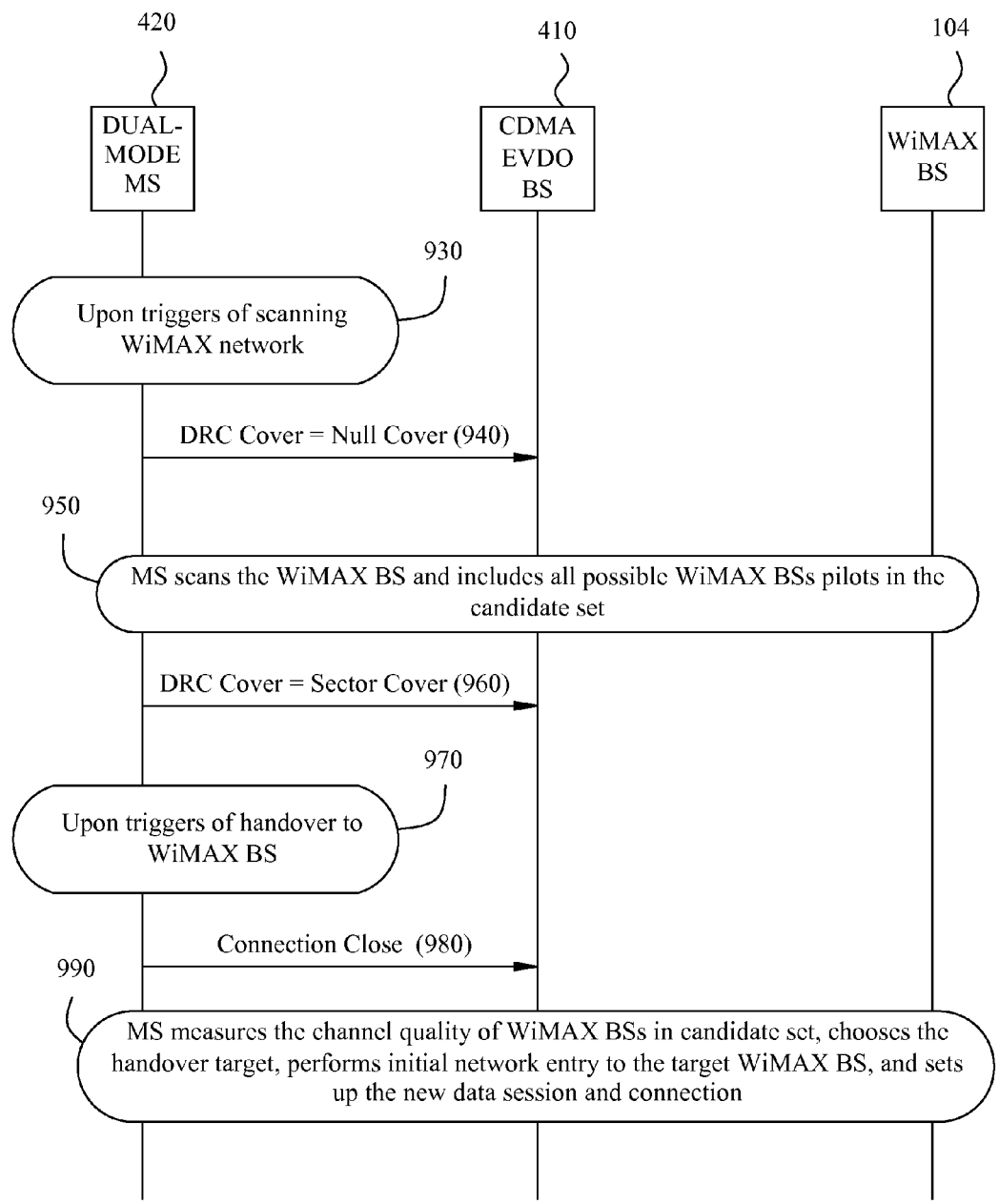
FIG. 9 illustrates a call flow of example operations for performing an MS-autonomous handover from a CDMA EVDO base station to a WiMAX base station, in accordance with certain embodiments of the present disclosure.

FIG. 9 further illustrates the MS-autonomous CDMA EVDO to WiMAX handover procedure and details the interaction between the dual-mode MS 420, the CDMA BS 410, and the WiMAX BS 104. The handover process may begin with a trigger for scanning the WiMAX BSs at 930. The MS may then notify the CDMA EVDO BS of the impending scan by sending a DRC Cover=Null Cover message at 940. Thereafter, the MS may scan for WiMAX BSs and include all possible WiMAX BSs in the candidate set at 950. Following the scan, the MS may notify the CDMA EVDO BS of completion of the scanning process by sending a DRC Cover=Sector Cover message to the CDMA EVDO BS at 960. Upon triggering a handover at 970, the MS may send a Connection Close message at 980 to the CDMA EVDO BS whereupon the MS may measure the channel quality of the WiMAX BSs in the current candidate set, choose the handover target, perform initial network entry to the target WiMAX BS, and set up the new data session and connection at 990.

Figure 5A:
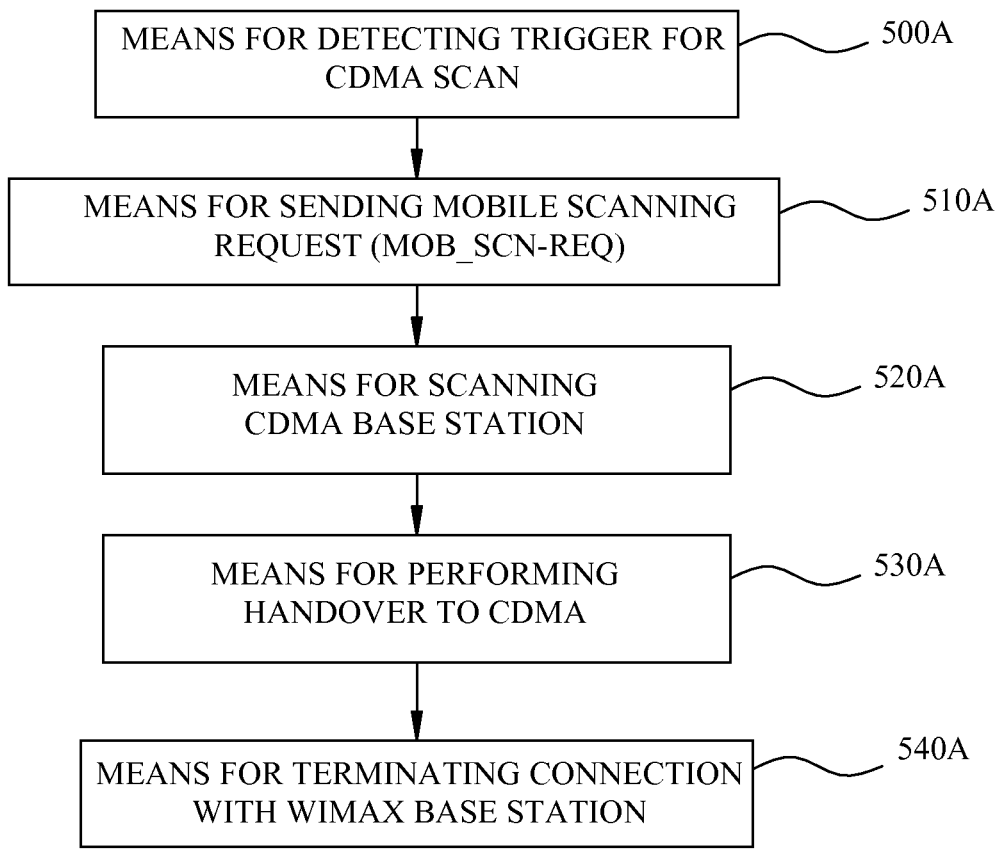
FIG. 5A is a block diagram of means corresponding to the example operations of FIG. 5 for performing an autonomous handover from a WiMAX network to a CDMA EVDO/1× network, in accordance with certain embodiments of the present disclosure.
Figure 8A:
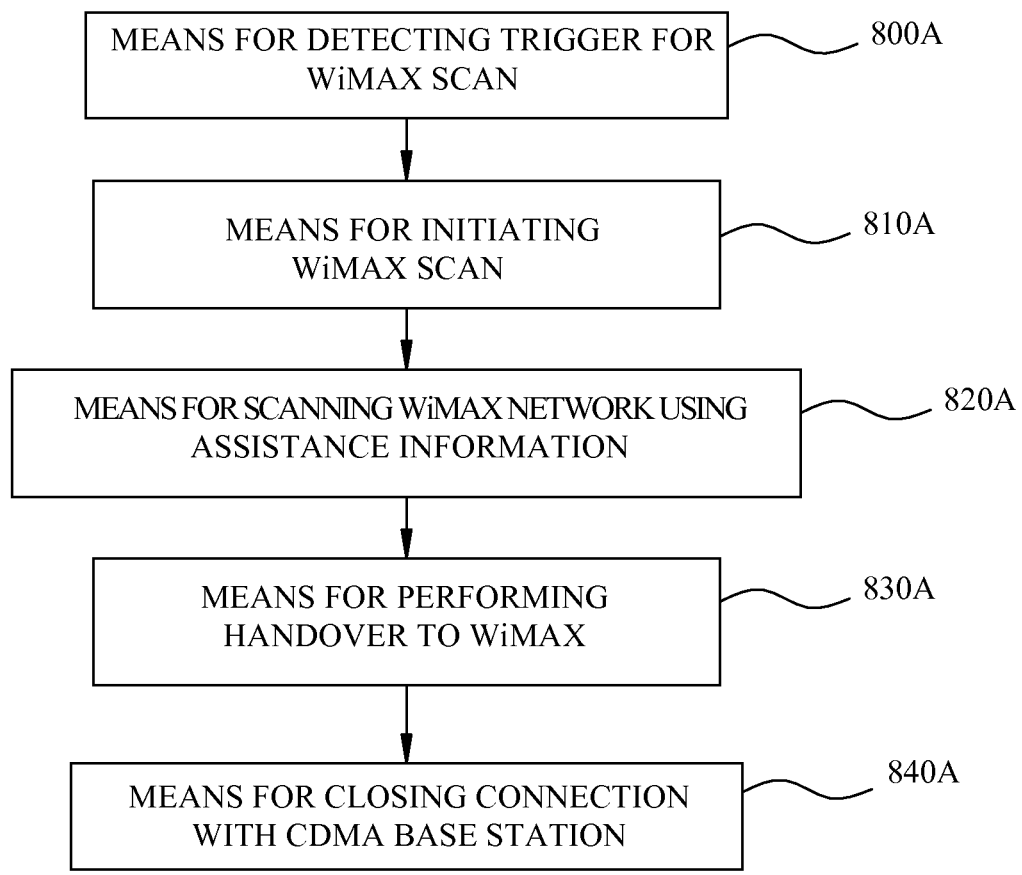
FIG. 8A is a block diagram of means corresponding to the example operations of FIG. 8 for performing an autonomous handover from a CDMA EVDO network to a WiMAX network, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 500-540 illustrated in FIG. 5 correspond to means-plus-function blocks 500A-540A illustrated in FIG. 5A, and blocks 800-840 illustrated in FIG. 8 correspond to means-plus-function blocks 800A-840A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside (e.g., stored, encoded, etc.) in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A storage media may be any available media that can be accessed by a computer or by one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing handover between network service via first and second radio access technologies (RATs), comprising:
    while communicating via the first RAT, detecting a trigger to initiate a scan for network service via the second RAT, wherein the first and second RATs are different, and wherein the trigger is detected when a number of neighbors received in a neighbor-listing message is less than a number of neighbors previously received in a neighbor-listing message;
    initiating the scan for the second RAT, in response to detecting the trigger; and
    determining whether to handover to network service via the second RAT based on results of the scan.

2. The method of claim 1, wherein detecting the trigger comprises reacting to a periodic trigger.

3. The method of claim 1, wherein the first RAT is WiMAX (Worldwide Interoperability for Microwave Access) and the second RAT is CDMA (Code Division Multiple Access) EVDO (Evolution-Data Optimized) or 1×RTT (one times Radio Transmission Technology).

4. The method of claim 3, wherein initiating the scan comprises transmitting a Scanning Interval Allocation Request (MOB_SCN-REQ) message.

5. The method of claim 3, wherein detecting the trigger comprises:
    determining that a mean carrier-to-interference-plus-noise ratio (CINR) or a mean received signal strength indicator (RSSI) in the network service via the first RAT falls below a first threshold; and
    determining there is no other channel communicating via the first RAT with a mean CINR or a mean RSSI above a second threshold.

6. The method of claim 3, wherein detecting the trigger comprises determining when a mean carrier-to-interference-plus-noise ratio (CINR) of all elements in a diversity set falls below a threshold.

7. The method of claim 6, wherein the threshold is equal to $(1+\gamma)*H\_Delete$, $\gamma$ is an adjustment factor $\geq 0$, and H_Delete is a WiMAX threshold used to determine when to drop an element from the diversity set.

8. The method of claim 3, wherein the neighbor-listing message comprises a Neighbor Advertisement Message and detecting the trigger comprises determining when the number of neighbors received in the Neighbor Advertisement Message (MOB_NBR-ADV) is less than $\beta$ multiplied by an average number of the neighbors in previous Neighbor Advertisement Messages, wherein $\beta$ is an adjustment factor $\geq 0$.

9. The method of claim 8, wherein the average number of the neighbors, represented as $A\_N\_NBR(n)$ for the $n^{th}$ Neighbor Advertisement Message, is an exponential moving average equal to $\alpha*N\_NBR(n)+(1-\alpha)*A\_N\_NBR(n-1)$, where $\alpha$ is a smoothing factor for the moving average and $N\_NBR(n)$ is the number of the neighbors for the $n^{th}$ MOB_NBR-ADV message.

10. The method of claim 1, wherein the first RAT is CDMA (Code Division Multiple Access) EVDO (Evolution-Data Optimized) and the second RAT is WiMAX (Worldwide Interoperability for Microwave Access).

11. The method of claim 10, wherein initiating the scan comprises transmitting "null cover" as a Data Rate Control (DRC) cover.

12. The method of claim 10, wherein detecting the trigger comprises determining when all pilots in the CDMA active set have a pilot strength less than a threshold.

13. The method of claim 12, wherein the threshold is equal to $(1+\gamma)*T\_DROP$, $\gamma$ is an adjustment factor $\geq 0$, and T_DROP is a CDMA threshold used to determine when to drop a pilot from the CDMA active set.

14. The method of claim 10, wherein the neighbor-listing message comprises a Neighbor List Message and detecting the trigger comprises determining when the number of neighbors received in the Neighbor List Message is less than $\beta$ multiplied by an average number of the neighbors in previous Neighbor List Messages, wherein $\beta$ is an adjustment factor $\geq 0$.

15. The method of claim 14, wherein the average number of the neighbors, represented as $A\_N\_NBR(n)$ for the $n^{th}$ Neighbor List Message, is an exponential moving average equal to $\alpha*N\_NBR(n)+(1-\alpha)*A\_N\_NBR(n-1)$, where $\alpha$ is a smoothing factor for the moving average and $N\_NBR(n)$ is the number of the neighbors for the $n^{th}$ Neighbor List Message.

16. The method of claim 14, wherein the Neighbor List Message is at least one of an Extended Neighbor List Message, a General Neighbor List Message, or a Universal Neighbor List Message.

17. A receiver for wireless communication, comprising:
at least one processor configured to execute:
trigger-detection logic configured to detect a trigger to initiate a scan for network service via a second radio access technology (RAT) while communicating via a first RAT, wherein the first and second RATs are different, wherein the trigger-detection logic is configured to detect the trigger when a number of neighbors received in a neighbor-listing message is less than a number of neighbors previously received in a neighbor-listing message;
scan-initiation logic configured to initiate the scan for the second RAT, in response to detecting the trigger; and
handover-determination logic configured to determine whether to handover to network service via the second RAT based on results of the scan; and
a memory coupled to the at least one processor.

18. The receiver of claim 17, wherein the trigger-detection logic is further configured to react to a periodic trigger.

19. The receiver of claim 17, wherein the first RAT is WiMAX (Worldwide Interoperability for Microwave Access) and the second RAT is CDMA (Code Division Multiple Access) EVDO (Evolution-Data Optimized) or 1×RTT (one times Radio Transmission Technology).

20. The receiver of claim 19, wherein the trigger-detection logic is further configured to determine whether a mean carrier-to-interference-plus-noise ratio (CINR) or a mean received signal strength indicator (RSSI) in the network service via the first RAT falls below a first threshold and to determine whether there is no other channel communicating via the first RAT with a mean CINR or a mean RSSI above a second threshold.

21. The receiver of claim 19, wherein the trigger-detection logic is further configured to determine when a mean carrier-to-interference-plus-noise ratio (CINR) of all elements in a diversity set falls below a threshold.

22. The receiver of claim 21, wherein the threshold is equal to $(1+\gamma)*H\_Delete$, $\gamma$ is an adjustment factor $\geq 0$, and H_Delete is a WiMAX threshold used to determine when to drop an element from the diversity set.

23. The receiver of claim 19, wherein the neighbor-listing message comprises a Neighbor Advertisement Message and the trigger-detection logic is further configured to determine when the number of neighbors received in the Neighbor Advertisement Message (MOB_NBR-ADV) is less than $\beta$ multiplied by an average number of the neighbors in previous Neighbor Advertisement Messages, wherein $\beta$ is an adjustment factor $\geq 0$.

24. The receiver of claim 23, wherein the average number of the neighbors, represented as $A\_N\_NBR(n)$ for the $n^{th}$ Neighbor Advertisement Message, is an exponential moving average equal to $\alpha*N\_NBR(n)+(1-\alpha)*A\_N\_NBR(n-1)$, where $\alpha$ is a smoothing factor for the moving average and $N\_NBR(n)$ is the number of the neighbors for the $n^{th}$ MOB_NBR-ADV message.

25. The receiver of claim 17, wherein the first RAT is CDMA (Code Division Multiple Access) EVDO (Evolution-Data Optimized) and the second RAT is WiMAX (Worldwide Interoperability for Microwave Access).

26. The receiver of claim 25, wherein the trigger-detection logic is further configured to determine when all pilots in the CDMA active set have a pilot strength less than a threshold.

27. The receiver of claim 26, wherein the threshold is equal to $(1+\gamma)*T\_DROP$, $\gamma$ is an adjustment factor $\geq 0$, and T_DROP is a CDMA threshold used to determine when to drop a pilot from the CDMA active set.

28. The receiver of claim 25, wherein the neighbor-listing message comprises a Neighbor List Message and the trigger-detection logic is further configured to determine when the number of neighbors received in the Neighbor List Message is less than $\beta$ multiplied by an average number of the neighbors in previous Neighbor List Messages, wherein $\beta$ is an adjustment factor $\geq 0$.

29. The receiver of claim 28, wherein the average number of the neighbors, represented as $A\_N\_NBR(n)$ for the $n^{th}$ Neighbor List Message, is an exponential moving average equal to $\alpha*N\_NBR(n)+(1-\alpha)*A\_N\_NBR(n-1)$, where $\alpha$ is a smoothing factor for the moving average and $N\_NBR(n)$ is the number of the neighbors for the $n^{th}$ Neighbor List Message.

30. The receiver of claim 28, wherein the Neighbor List Message is at least one of an Extended Neighbor List Message, a General Neighbor List Message, or a Universal Neighbor List Message.

31. An apparatus for performing handover between network service via first and second radio access technologies (RATs), comprising:
means for detecting a trigger to initiate a scan for network service via the second RAT while communicating via the first RAT, wherein the first and second RATs are different, wherein the means for detecting a trigger is configured to detect the trigger when a number of neighbors received in a neighbor-listing message is less than a number of neighbors previously received in a neighbor-listing message;
means for initiating the scan for the second RAT, in response to detecting the trigger; and
means for determining whether to handover to network service via the second RAT based on results of the scan.

32. The apparatus of claim 31, wherein the means for detecting the trigger is further configured to react to a periodic trigger.

33. The apparatus of claim 31, wherein the first RAT is WiMAX (Worldwide Interoperability for Microwave Access) and the second RAT is CDMA (Code Division Multiple Access) EVDO (Evolution-Data Optimized) or 1×RTT (one times Radio Transmission Technology).

34. The apparatus of claim 33, wherein the means for detecting the trigger is further configured to determine whether a mean carrier-to-interference-plus-noise ratio (CINR) or a mean received signal strength indicator (RSSI) in the network service via the first RAT falls below a first threshold and to determine whether there is no other channel communicating via the first RAT with a mean CINR or a mean RSSI above a second threshold.

35. The apparatus of claim 33, wherein the means for detecting the trigger is further configured to determine when a mean carrier-to-interference-plus-noise ratio (CINR) of all elements in a diversity set falls below a threshold.

36. The apparatus of claim 35, wherein the threshold is equal to $(1+\gamma)*H\_Delete$, $\gamma$ is an adjustment factor $\geq 0$, and H_Delete is a WiMAX threshold used to determine when to drop an element from the diversity set.

37. The apparatus of claim 33, wherein the neighbor-listing message comprises a Neighbor Advertisement Message and the means for detecting the trigger is configured to determine when the number of neighbors received in the Neighbor Advertisement Message (MOB_NBR-ADV) is less than $\beta$ multiplied by an average number of the neighbors in previous Neighbor Advertisement Messages, wherein β is an adjustment factor ≥0.

38. The apparatus of claim 37, wherein the average number of the neighbors, represented as A_N_NBR(n) for the $n^{th}$ Neighbor Advertisement Message, is an exponential moving average equal to α*N_NBR(n)+(1−α)*A_N_NBR(n−1), where α is a smoothing factor for the moving average and N_NBR(n) is the number of the neighbors for the $n^{th}$ MOB_NBR-ADV message.

39. The apparatus of claim 31, wherein the first RAT is CDMA (Code Division Multiple Access) EVDO (Evolution-Data Optimized) and the second RAT is WiMAX (Worldwide Interoperability for Microwave Access).

40. The apparatus of claim 39, wherein the means for detecting the trigger is further configured to determine when all pilots in the CDMA active set have a pilot strength less than a threshold.

41. The apparatus of claim 40, wherein the threshold is equal to (1+γ)*T_DROP, γ is an adjustment factor ≥0, and T_DROP is a CDMA threshold used to determine when to drop a pilot from the CDMA active set.

42. The apparatus of claim 39, wherein the neighbor-listing message comprises a Neighbor List Message and the means for detecting the trigger is configured to determine when the number of neighbors received in the Neighbor List Message is less than β multiplied by an average number of the neighbors in previous Neighbor List Messages, wherein β is an adjustment factor ≥0.

43. The apparatus of claim 42, wherein the average number of the neighbors, represented as A_N_NBR(n) for the $n^{th}$ Neighbor List Message, is an exponential moving average equal to α*N_NBR(n)+(1−α)*A_N_NBR(n−1), where α is a smoothing factor for the moving average and N_NBR(n) is the number of the neighbors for the $n^{th}$ Neighbor List Message.

44. The apparatus of claim 42, wherein the Neighbor List Message is at least one of an Extended Neighbor List Message, a General Neighbor List Message, or a Universal Neighbor List Message.

45. A mobile device, comprising:
a receiver front-end for communicating via a first radio access technology (RAT);
trigger-detection logic configured to detect a trigger to initiate a scan for network service via a second RAT while communicating via the first RAT, wherein the first and second RATs are different, wherein the trigger-detection logic is configured to detect the trigger when a number of neighbors received in a neighbor-listing message is less than a number of neighbors previously received in a neighbor-listing message;
scan-initiation logic configured to initiate the scan for the second RAT, in response to detecting the trigger; and
handover-determination logic configured to determine whether to handover to network service via the second RAT based on results of the scan.

46. The mobile device of claim 45, wherein the trigger-detection logic is further configured to react to a periodic trigger.

47. The mobile device of claim 45, wherein the first RAT is WiMAX (Worldwide Interoperability for Microwave Access) and the second RAT is CDMA (Code Division Multiple Access) EVDO (Evolution-Data Optimized) or 1×RTT (one times Radio Transmission Technology).

48. The mobile device of claim 47, wherein the trigger-detection logic is further configured to determine whether a mean carrier-to-interference-plus-noise ratio (CINR) or a mean received signal strength indicator (RSSI) in the network service via the first RAT falls below a first threshold and to determine whether there is no other channel communicating via the first RAT with a mean CINR or a mean RSSI above a second threshold.

49. The mobile device of claim 47, wherein the trigger-detection logic is further configured to determine when a mean carrier-to-interference-plus-noise ratio (CINR) of all elements in a diversity set falls below a threshold.

50. The mobile device of claim 49, wherein the threshold is equal to (1+γ)*H_Delete, γ is an adjustment factor ≥0, and H_Delete is a WiMAX threshold used to determine when to drop an element from the diversity set.

51. The mobile device of claim 47, wherein the neighbor-listing message comprises a Neighbor Advertisement Message and the trigger-detection logic is configured to determine when the number of neighbors received in the Neighbor Advertisement Message (MOB_NBR-ADV) is less than β multiplied by an average number of the neighbors in previous Neighbor Advertisement Messages, wherein β is an adjustment factor ≥0.

52. The mobile device of claim 51, wherein the average number of the neighbors, represented as A_N_NBR(n) for the $n^{th}$ Neighbor Advertisement Message, is an exponential moving average equal to α*N_NBR(n)+(1−α)*A_N_NBR(n−1), where α is a smoothing factor for the moving average and N_NBR(n) is the number of the neighbors for the $n^{th}$ MOB_NBR-ADV message.

53. The mobile device of claim 45, wherein the first RAT is CDMA (Code Division Multiple Access) EVDO (Evolution-Data Optimized) and the second RAT is WiMAX (Worldwide Interoperability for Microwave Access).

54. The mobile device of claim 53, wherein the trigger-detection logic is further configured to determine when all pilots in the CDMA active set have a pilot strength less than a threshold.

55. The mobile device of claim 54, wherein the threshold is equal to (1+γ)*T_DROP, γ is an adjustment factor ≥0, and T_DROP is a CDMA threshold used to determine when to drop a pilot from the CDMA active set.

56. The mobile device of claim 53, wherein the neighbor-listing message comprises a Neighbor List Message and the trigger-detection logic is configured to determine when the number of neighbors received in the Neighbor List Message is less than β multiplied by an average number of the neighbors in previous Neighbor List Messages, wherein β is an adjustment factor ≥0.

57. The mobile device of claim 56, wherein the average number of the neighbors, represented as A_N_NBR(n) for the $n^{th}$ Neighbor List Message, is an exponential moving average equal to α*N_NBR(n)+(1−α)*A_N_NBR(n−1), where α is a smoothing factor for the moving average and N_NBR(n) is the number of the neighbors for the $n^{th}$ Neighbor List Message.

58. The mobile device of claim 56, wherein the Neighbor List Message is at least one of an Extended Neighbor List Message, a General Neighbor List Message, or a Universal Neighbor List Message.

59. A computer-program apparatus for performing handover between network service via first and second radio access technologies (RATs) comprising a non-transitory computer readable medium having instructions stored thereon, the instructions being executable by one or more processors and the instructions comprising:
instructions for, while communicating via the first RAT, detecting a trigger to initiate a scan for network service via the second RAT, wherein the first and second RATs are different, wherein the trigger is detected when a number of neighbors received in a neighbor-listing message is less than a number of neighbors previously received in a neighbor-listing message;

instructions for initiating the scan for the second RAT, in response to detecting the trigger; and instructions for determining whether to handover to network service via the second RAT based on results of the scan.

60. The computer-program apparatus of claim 59, wherein the instructions for detecting the trigger comprise instructions for reacting to a periodic trigger.

61. The computer-program apparatus of claim 59, wherein the first RAT is WiMAX (Worldwide Interoperability for Microwave Access) and the second RAT is CDMA (Code Division Multiple Access) EVDO (Evolution-Data Optimized) or 1×RTT (one times Radio Transmission Technology).

62. The computer-program apparatus of claim 61, wherein the instructions for detecting the trigger comprise:

instructions for determining that a mean carrier-to-interference-plus-noise ratio (CINR) or a mean received signal strength indicator (RSSI) in the network service via the first RAT falls below a first threshold; and instructions for determining there is no other channel communicating via the first RAT with a mean CINR or a mean RSSI above a second threshold.

63. The computer-program apparatus of claim 61, wherein the instructions for detecting the trigger comprise instructions for determining when a mean carrier-to-interference-plus-noise ratio (CINR) of all elements in a diversity set falls below a threshold.

64. The computer-program apparatus of claim 63, wherein the threshold is equal to $(1+\gamma)^*H\_Delete$, $\gamma$ is an adjustment factor $\geq 0$, and H_Delete is a WiMAX threshold used to determine when to drop an element from the diversity set.

65. The computer-program apparatus of claim 61, wherein the neighbor-listing message comprises a Neighbor Advertisement Message and the instructions for detecting the trigger comprise instructions for determining when the number of neighbors received in the Neighbor Advertisement Message (MOB_NBR-ADV) is less than $\beta$ multiplied by an average number of the neighbors in previous Neighbor Advertisement Messages, wherein $\beta$ is an adjustment factor $\geq 0$.

66. The computer-program apparatus of claim 65, wherein the average number of the neighbors, represented as $A\_N\_NBR(n)$ for the $n^{th}$ Neighbor Advertisement Message, is an exponential moving average equal to $\alpha^*N\_NBR(n)+(1-\alpha)^*A\_N\_NBR(n-1)$, where $\alpha$ is a smoothing factor for the moving average and $N\_NBR(n)$ is the number of the neighbors for the $n^{th}$ MOB_NBR-ADV message.

67. The computer-program apparatus of claim 59, wherein the first RAT is CDMA (Code Division Multiple Access) EVDO (Evolution-Data Optimized) and the second RAT is WiMAX (Worldwide Interoperability for Microwave Access).

68. The computer-program apparatus of claim 67, wherein the instructions for detecting the trigger comprise instructions for determining when all pilots in the CDMA active set have a pilot strength less than a threshold.

69. The computer-program apparatus of claim 68, wherein the threshold is equal to $(1+\gamma)^*T\_DROP$, $\gamma$ is an adjustment factor $\geq 0$, and T_DROP is a CDMA threshold used to determine when to drop a pilot from the CDMA active set.

70. The computer-program apparatus of claim 67, wherein the neighbor-listing message comprises a Neighbor List Message and the instructions for detecting the trigger comprise instructions for determining when the number of neighbors received in the Neighbor List Message is less than $\beta$ multiplied by an average number of the neighbors in previous Neighbor List Messages, wherein $\beta$ is an adjustment factor $\geq 0$.

71. The computer-program apparatus of claim 70, wherein the average number of the neighbors, represented as $A\_N\_NBR(n)$ for the $n^{th}$ Neighbor List Message, is an exponential moving average equal to $\alpha^*N\_NBR(n)+(1-\alpha)^*A\_N\_NBR(n-1)$, where $\alpha$ is a smoothing factor for the moving average and $N\_NBR(n)$ is the number of the neighbors for the $n^{th}$ Neighbor List Message.

72. The computer-program apparatus of claim 70, wherein the Neighbor List Message is at least one of an Extended Neighbor List Message, a General Neighbor List Message, or a Universal Neighbor List Message.

* * * * *